US012792878B2

(12) United States Patent
Shin et al.

(10) Patent No.: US 12,792,878 B2
(45) Date of Patent: Nov. 10, 2026

(54) NEURAL NETWORK TRAINING METHOD AND APPARATUS

(71) Applicants: Samsung Electronics Co., Ltd., Suwon-si (KR); SNU R&DB FOUNDATION, Seoul (KR)

(72) Inventors: Sungho Shin, Namyangju-si (KR); Wonyong Sung, Seoul (KR); Yoonho Boo, Seoul (KR)

(73) Assignees: Samsung Electronics Co., Ltd., Suwon-si (KR); SNU R&DB FOUNDATION, Seoul (KR)

( * ) Notice: Subject to any disclaimer, the term of this patent is extended or adjusted under 35 U.S.C. 154(b) by 1074 days.

(21) Appl. No.: 17/526,221

(22) Filed: Nov. 15, 2021

(65) Prior Publication Data

US 2022/0237436 A1 Jul. 28, 2022

(30) Foreign Application Priority Data

Jan. 22, 2021 (KR) ........................ 10-2021-0009618

(51) Int. Cl.
*G06N 3/045* (2023.01)
*G06N 3/08* (2023.01)

(52) U.S. Cl.
CPC ............... *G06N 3/045* (2023.01); *G06N 3/08* (2013.01)

(58) Field of Classification Search
CPC ........ G06N 3/045; G06N 3/08; G06N 3/0442; G06N 3/0455; G06N 3/0464; G06N 3/0475; G06N 3/0495; G06N 3/09
See application file for complete search history.

(56) References Cited

U.S. PATENT DOCUMENTS

| | | | |
|---|---|---|---|
| 2016/0328646 A1 | 11/2016 | Lin et al. | |
| 2017/0286830 A1 | 10/2017 | El-Yaniv et al. | |
| 2019/0042948 A1 | 2/2019 | Lee et al. | |
| 2019/0340492 A1 | 11/2019 | Burger et al. | |
| 2020/0026986 A1 | 1/2020 | Ha et al. | |

(Continued)

FOREIGN PATENT DOCUMENTS

| | | |
|---|---|---|
| KR | 10-2019-0054454 A | 5/2019 |
| KR | 10-2019-0128885 A | 11/2019 |
| KR | 10-2020-0035198 A | 4/2020 |

(Continued)

OTHER PUBLICATIONS

Hubara, Italy et al. "Quantized Neural Networks: Training Neural Networks with Low Precision Weights and Activations" *Journal of Machine Learning Research vol. 18* Apr. 2018 (30 pages in English).

(Continued)

*Primary Examiner* — Abdullah Al Kawsar
*Assistant Examiner* — Gisel Gabriela Faccenda
(74) *Attorney, Agent, or Firm* — NSIP Law

(57) ABSTRACT

Disclosed is a neural network training method and apparatus. The neural network training method includes a neural network training method, including receiving a neural network model that is first trained based on a first weight, second training the first trained neural network model based on learning rates to obtain second weights from a second trained neural network, and third training the second trained neural network model based on the second weights.

10 Claims, 5 Drawing Sheets

(56) References Cited

U.S. PATENT DOCUMENTS

2020/0202213 A1 6/2020 Darvish Rouhani et al.
2022/0129759 A1* 4/2022 Yao ........................ G06N 3/084

FOREIGN PATENT DOCUMENTS

KR 10-2020-0086581 A 7/2020
WO WO 2019/212877 A1 11/2019

OTHER PUBLICATIONS

Izmailov, Pavel et al. "Averaging Weights Leads to Wider Optima and Better Generalization" arXiv:1803.05407v3 Feb. 25, 2019 (12 pages in English).
Yang, Guandao et al. "SWALP: Stochastic Weight Averaging in Low-Precision Training" arXiv:1904.11943v2 May 20, 2019 (27 pages in English).
Shin, Sungho et al. "SQWA: Stochastic Quantized Weight Averaging for Improving The Generalization Capability of Low-Precision Deep Neural Networks" arXiv:2002.00343v1 Feb. 2, 2020 (11 pages in English).

* cited by examiner

NEURAL NETWORK TRAINING METHOD AND APPARATUS

CROSS-REFERENCE TO RELATED APPLICATIONS

This application claims the benefit under 35 USC § 119(a) of Korean Patent Application No. 10-2021-0009618 filed on Jan. 22, 2021, in the Korean Intellectual Property Office, the entire disclosure of which is incorporated herein by reference for all purposes.

BACKGROUND

Field

The following description relates to a neural network training method and apparatus.

Description of Related Art

Deep learning applications exhibit very high performance in speech and image recognition and natural language processing. As a result, demand for on-device deep learning for real life artificial intelligence services is increasing.

However, deep learning requires a lot of operations and large memory capacity, which makes it difficult to achieve high performance in embedded systems that have limited hardware resources.

In order to alleviate this issue, lightened deep learning models with low operation complexity have been developed. One of the lightened deep learning model techniques is a quantization technique that limits the values that may be represented by deep learning model weights.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a neural network training method, including receiving a neural network model that is first trained based on a first weight, second training the first trained neural network model based on learning rates to obtain second weights from a second trained neural network, and third training the second trained neural network model based on the second weights.

The first weight may include a quantized weight.

The obtaining of the second weights may include second training the first trained neural network model based on the learning rates, and obtaining the second weights from the second trained neural network model based on the learning rates.

The second training of the first trained neural network model based on the learning rates may include second training the first trained neural network model based on a cyclical learning rate.

The cyclical learning rate may change linearly or nonlinearly within one cycle.

The obtaining of the second weights from the second trained neural network model based on the learning rates may include obtaining the second weights from the second trained neural network model based on a lowest learning rate from among the learning rates.

The third training may include obtaining an average value of the second weights, obtaining a quantized average value by quantizing the average value, and third training the second trained neural network model based on the quantized average value.

The obtaining of the average value may include obtaining a moving average value of the second weights.

The third training may include third training the second trained neural network model with an epoch less than or equal to a predetermined epoch based on a learning rate less than a maximum value of the learning rates.

In another general aspect, there is provided a neural network training apparatus, including a receiver configured to receive a neural network model that is first trained based on a first weight, and a processor configured to second train the first trained neural network model based on learning rates to obtain second weights from a second trained neural network model, and to third train the second trained neural network model based on the second weights.

The first weight may include a quantized weight.

The processor may be configured to second train the first trained neural network model based on the learning rates, and to obtain the second weights from the second trained neural network model based on the learning rates.

The processor may be configured to second train the first trained neural network model based on a cyclical learning rate.

The cyclical learning rate may change linearly or nonlinearly within one cycle.

The processor may be configured to obtain the second weights from the second trained neural network model based on a lowest learning rate from among the learning rates.

The processor may be configured to obtain an average value of the second weights, to obtain a quantized average value by quantizing the average value, and to third train the second trained neural network model based on the quantized average value.

The processor may be configured to obtain a moving average value of the second weights.

The processor may be configured to third train the second trained neural network model with an epoch less than or equal to a predetermined epoch based on a learning rate less than a maximum of the learning rates.

In another general aspect, there is provided a processor-implemented neural network training method, including initialized a neural network and first training the initialized neural network model with full precision, quantizing the first trained neural network, retraining the quantizing neural network based on a cyclical learning rate, storing weights of the retrained neural network, in response to a learning rate being lowest within a cycle, averaging the stored weights, quantizing the averaged stored weights based on a desired accuracy of the neural network, and second training the neural network based on the quantized averaged stored weights.

A high learning rate and a low learning rate may be alternated in the cyclical learning rate.

The cyclical learning rate may change according to a cycle of an epoch.

Other features and aspects will be apparent from the following detailed description, the drawings, and the claims.

Figure 1:
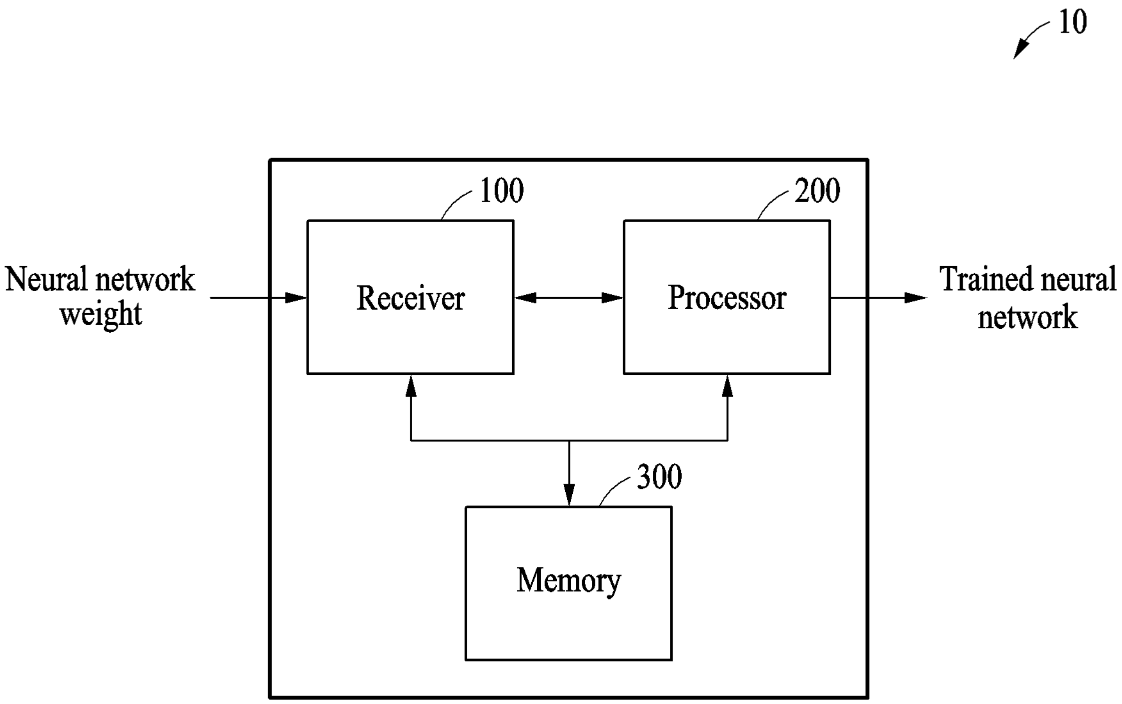
FIG. 1 illustrates an example of a neural network training apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms of "first," "second,", A, B, (a), or (b) are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The singular forms "a", "an", and "the" are intended to include the plural forms as well, unless the context clearly indicates otherwise. As used herein, the singular forms are intended to include the plural forms as well, unless the context clearly indicates otherwise. As used herein, the term "and/or" includes any one and any combination of any two or more of the associated listed items. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

The use of the term "may" herein with respect to an example or embodiment (e.g., as to what an example or embodiment may include or implement) means that at least one example or embodiment exists where such a feature is included or implemented, while all examples are not limited thereto.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of a neural network training apparatus.

Referring to FIG. 1, a neural network training apparatus 10 may train a neural network (or neural network model). In addition, the neural network training apparatus 10 may perform inference using the trained neural network.

The neural network training apparatus 10 may train the neural network with low operation complexity. In an example, the neural network training apparatus 10 may lower the complexity of a neural network operation by training the neural network using quantization.

The neural network or an artificial neural network (ANN) may generate mapping between input patterns and output patterns, and may have a generalization capability to generate a relatively correct output with respect to an input pattern that has not been used for training. The neural network may refer to a general model that has an ability to solve a problem, where artificial neurons (nodes) forming the network through synaptic combinations change a connection strength of synapses through training.

A neural network includes a plurality of layers, such as an input layer, a plurality of hidden layers, and an output layer. Each layer of the neural network may include a plurality of nodes. Each node may indicate an operation or computation unit having at least one input and output, and the nodes may be connected to one another.

The input layer may include one or more nodes to which data is directly input without being through a connection to another node. The output layer may include one or more output nodes that are not connected to another node. The hidden layers may be the remaining layers of the neural network from which the input layer and the output layer are excluded, and include nodes corresponding to an input node or output node in a relationship with another node. According to examples, the number of hidden layers included in the neural network, the number of nodes included in each layer, and/or a connection between the nodes may vary. A neural network including a plurality of hidden layers may also be referred to as a deep neural network (DNN).

A weight may be set for a connection between nodes of the neural network. For example, a weight may be set for a connection between a node included in the input layer and another node included in a hidden layer. The weight may be adjusted or changed. The weight may determine the influence of a related data value on a final result as it increases, decreases, or maintains the data value.

The neural network may include a deep neural network (DNN). The neural network may include a convolutional neural network (CNN), a recurrent neural network (RNN), a perceptron, a multiplayer perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN).

The neural network may be a model with a machine learning structure designed to extract feature data from input data and to provide an inference operation or prediction based on the feature data. The feature data may be data associated with a feature obtained by abstracting input data. If input data is an image, feature data may be data obtained by abstracting the image and may be represented in a form of, for example, a vector. The inference operation may include, for example, pattern recognition (e.g., object recognition, facial identification, etc.), sequence recognition (e.g., speech, gesture, and written text recognition, machine translation, machine interpretation, etc.), control (e.g., vehicle control, process control, etc.), recommendation services, decision making, medical diagnoses, financial applications, data mining, and the like.

In an example, the neural network training apparatus 10 may be implemented on an embedded system with limited hardware resources by using a lightened neural network model. The neural network training apparatus 10 may perform on-device training and on-device inference.

The neural network training apparatus 10 may be implemented by a printed circuit board (PCB) such as a motherboard, an integrated circuit (IC), or a system on a chip (SoC). For example, the neural network training apparatus 10 may be implemented by an application processor.

In addition, the neural network training apparatus 10 may be implemented in a personal computer (PC), a data server, a home appliance such as a television, a digital television (DTV), a smart television, a refrigerator, a smart home device, a vehicle such as a smart vehicle, an Internet of Things (IoT) device, or a portable device.

The portable device may be implemented as a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), an artificial intelligence (AI) speaker, a personal navigation device or portable navigation device (PND), a handheld game console, an e-book, or a smart device. The smart device may be implemented as a smart watch, a smart band, or a smart ring.

The neural network training apparatus 10 may train the neural network by processing a weight of the neural network model. The neural network training apparatus 10 may generate a lightened neural network model by processing the weight of the neural network model trained with full precision.

The neural network training apparatus 10 may obtain a new weight by processing the weight of the neural network model that changes during training, and retrain the neural network model based on the new weight.

The neural network training apparatus 10 includes a receiver 100 and a processor 200. The neural network training apparatus 10 may further include a memory 300.

The receiver 100 may include a reception interface. The receiver 100 may receive the neural network model or a parameter corresponding to the neural network model. For example, the receiver 100 may receive the weight of the neural network model.

The receiver 100 may receive a neural network model that is initialized at random or a neural network model that is trained based on a predetermined weight. For example, the receiver 100 may receive a neural network model that is first trained based on a first weight. In this example, the first weight may include a quantized weight.

The receiver 100 may output the received neural network model or the parameter corresponding to the neural network model to the processor 200.

The processor 200 may process data stored in the memory 300. The processor 200 may execute a computer-readable code (for example, software) stored in the memory 300 and instructions triggered by the processor 200.

The "processor 200" may be a data processing device implemented by hardware including a circuit having a physical structure to perform desired operations. For example, the desired operations may include code or instructions included in a program.

For example, the hardware-implemented data processing device may include a microprocessor, a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a microcomputer, a processor core, a multi-core processor, a multiprocessor, a central processing unit (CPU), an application-specific integrated circuit (ASIC), a field-programmable gate array (FPGA), a central processing unit (CPU), a controller and an arithmetic logic unit (ALU), a digital signal processor (DSP), a graphics processing unit (GPU), or an application processor (AP), a neural processing unit (NPU), or a programmable logic unit (PLU).

In an example, the processor 200 may obtain second weights from a second trained neural network model by training the first trained neural network model for a second instance based on learning rates.

The processor 200 may second train the first trained neural network model based on the learning rates. The processor 200 may second train the first trained neural network model based on a cyclical learning rate. In this example, the cyclical learning rate may be a learning rate that changes according to a cycle of a predetermined epoch. The cyclical learning rate may change linearly or nonlinearly within one cycle.

The processor 200 may obtain the second weights from the second trained neural network model based on the learning rates. The processor 200 may obtain the second weights from the second trained neural network model based on a lowest learning rate among the learning rates. For example, the processor 200 may obtain the second weights from the second trained neural network model based a lowest learning rate within one cycle of the cyclical learning rate.

The processor 200 may third train the second trained neural network model based on the second weights. In an example, second training and third training may refer to retraining the neural network.

The processor 200 may obtain an average value of the second weights. In an example, the processor 200 may obtain a moving average value of the second weights. The process of calculating the moving average value will be described in more detail with reference to FIG. 2.

The processor 200 may obtain a quantized average value by quantizing the average value. In an example, the processor 200 may train the second trained neural network model for a third instance based on the quantized average value.

The processor 200 may third train the second trained neural network model with an epoch less than or equal to a predetermined epoch based on a learning rate less than a maximum value of the learning rates.

The memory 300 may store the neural network model or the parameter of the neural network model. The memory 300 may store instructions (or programs) executable by the processor. For example, the instructions may include instructions to perform an operation of the processor and/or an operation of each element of the processor.

The memory 300 is implemented as a volatile memory device or a non-volatile memory device.

The volatile memory device may be implemented as a dynamic random access memory (DRAM), a static random access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory.

Figure 2:
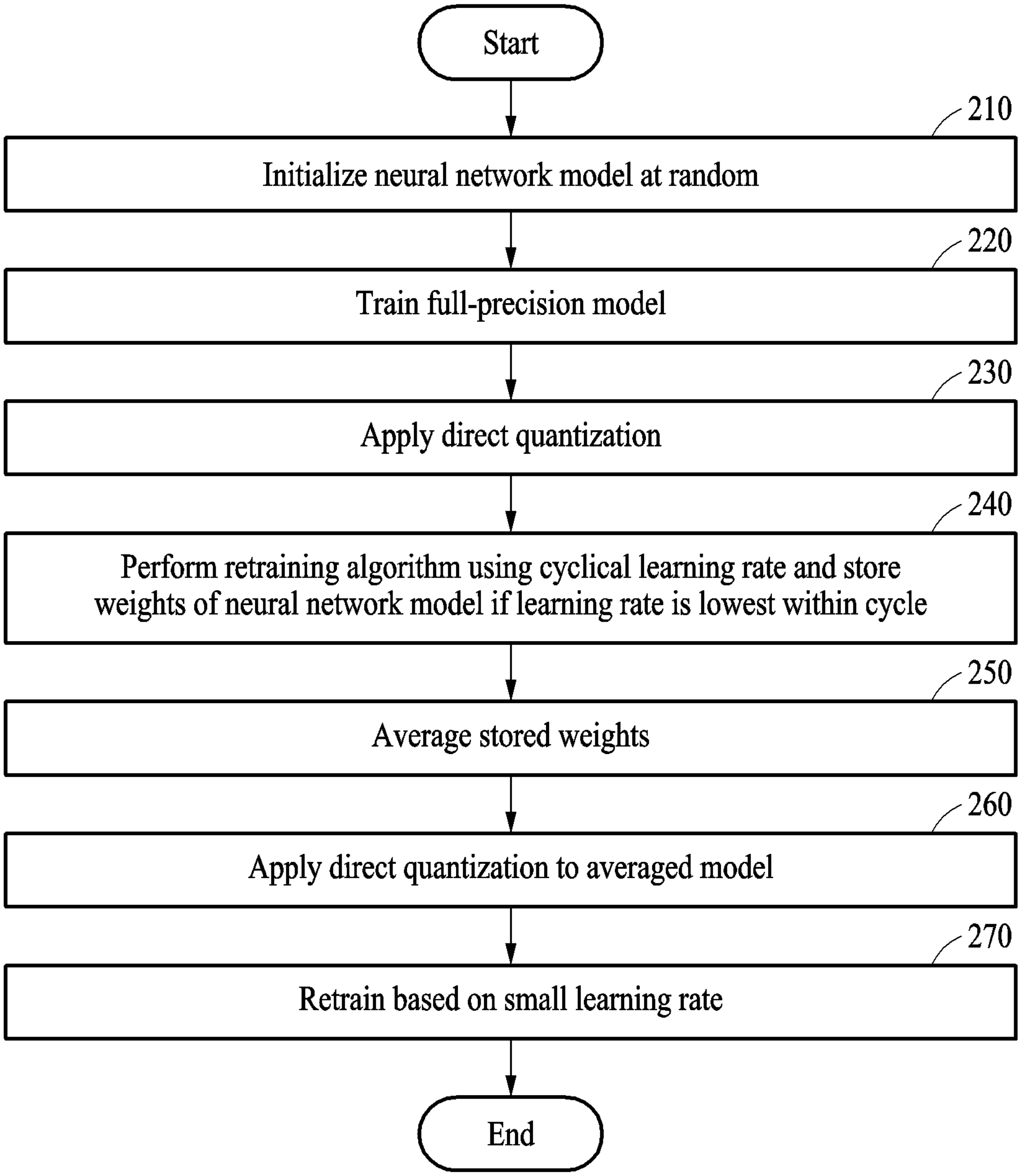
FIG. 2 illustrates an example of operations of the neural network training apparatus of FIG. 1.

FIG. 2 illustrates an example of operations of the neural network training apparatus of FIG. 1. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. Operations 210 to 270 of FIG. 2 may be performed by the neural network training apparatus 10 of FIG. 1. One or more blocks of FIG. 2, and combinations of the blocks, can be implemented by special purpose hardware-based computer, such as a processor, that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

Referring to FIG. 2, the processor 200 may train a neural network model. In operation 210, the processor 200 may initialize the neural network model at random. In operation 220, the processor 200 may obtain a full-precision neural network model by training the initialized neural network model with full precision. The full-precision neural network model may be a first trained neural network model.

In this example, the neural network may be first trained using batch normalization, knowledge distillation, and stochastic weight averaging.

In operation 230, the processor 200 may quantize the first trained neural network model. The processor 200 may quantize the neural network using direct quantization. For example, the processor 200 may quantize weights of the first trained neural network model. The process of quantization will be described further with reference to FIGS. 4A to 4C.

In operation 240, the processor 200 may perform a retraining algorithm using a cyclical learning rate, and when the learning rate is the lowest within the cycle, the weight of the neural network model may be stored in the memory 300.

In other words, the processor 200 may second train the first trained neural network using the cyclical learning rate. The processor 200 may obtain second weights by second training the first trained neural network model using the cyclical learning rate.

In this example, since the weights of the first trained neural network are quantized, the second weights obtained through the second training may have relatively low precision.

The processor 200 may third train the second trained neural network model based on the second weights obtained from the second trained neural network model.

In operation 250, the processor 200 may obtain an average value of the stored second weights. The processor 200 may calculate the average value of the low-precision second weights, thereby improving the precision of the neural network model.

In operation 260, the processor 200 may obtain a quantized average value by quantizing the average value of the second weights. The processor 200 may quantize the averaged neural network model based on the accuracy that is desired from the neural network that is finally obtained. For example, the processor 200 may quantize the averaged model to 2 bits.

In operation 270, the processor 200 may third train the second trained neural network model based on the quantized average value. The processor 200 may compensate for the performance deteriorated by quantization through the third training.

In this example, the processor 200 may third train the second trained neural network model with an epoch less than or equal to a predetermined epoch based on a learning rate less than a maximum value of the learning rates.

Since the averaged neural network model is positioned at the center of the loss surface, the processor 200 may perform the third training process only for a low learning rate and a small number of epochs.

Figure 3:
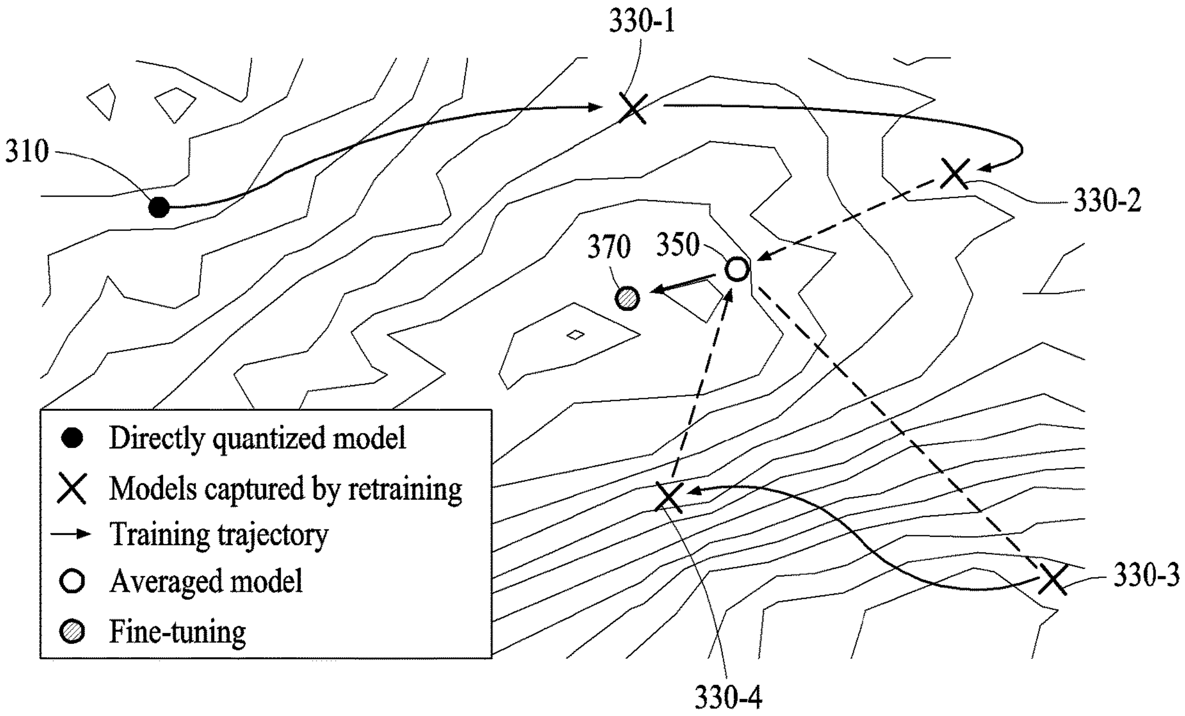
FIG. 3 illustrates an example of searching for a weight of a neural network by the neural network training apparatus of FIG. 1.

FIG. 3 illustrates an example of searching for a weight of a neural network by the neural network training apparatus of FIG. 1.

Referring to FIG. 3, the process of training a neural network may include inducing a neural network model to the center of the loss surface of training data. The example of FIG. 3 shows the positions of neural network models on the loss surface.

The processor 200 may obtain a directly quantized neural network model 310 by performing first training with full precision. Thereafter, the processor 200 may obtain neural network models 330-1 to 330-4 captured by retraining, by performing second training based on learning rates.

The processor 200 may obtain an averaged neural network model 350 by calculating an average value of the second weights of the neural network models 330-1 to 330-4 captured by retraining.

The processor 200 may finally obtain a finely tuned neural network model 370 through fine-tuning by third training the averaged neural network model 350.

Hereinafter, each process will be described in more detail.

Since quantizing the weight of the neural network model causes large perturbation of the neural network model, a properly trained neural network model may also exhibit relatively low performance after going through quantization multiple times.

Therefore, the processor 200 may retrain the neural network model to be positioned at the center of the loss surface. The processor 200 may extract second weights while training neural network models using a cyclical learning rate and calculate an average value of the second weights, thereby fine-tuning the weights.

The quantized loss surface may be rough compared to a neural network trained with high precision. Thus, the quantized neural network may be more difficult to optimize at low learning rates.

The processor 200 may train a neural network based on a cyclical learning rate where a high learning rate and a low learning rate are alternated. In an example, the processor 200 may perform fine-tuning of weights by utilizing an average value of the weights of the neural network trained based on the cyclical learning rate.

First, the processor 200 may first train the neural network with full precision. The processor 200 may perform full-precision first training using a floating-point neural network model. In this example, knowledge distillation or stochastic weight averaging may be used, as described above.

The processor 200 may obtain a first weight from the first trained neural network and quantize the first weight. Thereafter, the processor 200 may perform a second training on the first learned neural network model having the quantized first weight based on the cyclical learning rate. In this example, the processor 200 may use a discrete cyclical learning rate for generalization.

If a learning rate in the case of performing training with full precision is $\eta_f$, the processor 200 may determine the maximum value and the minimum value of the cyclical learning rate, as expressed by Equation 1 and Equation 2, respectively.

$$\eta_{cycleMax} = \frac{\max(\eta_f)}{10} \quad \text{[Equation 1]}$$

$$\eta_{cycleMin} = \frac{\min(\eta_f)}{10} \quad \text{[Equation 2]}$$

The maximum value and the minimum value of the cyclical learning rate of Equations 1 and 2 are suitable for low-precision (for example, 2-bit) quantization, and may change according to a change in the number of quantization bits. The values of the cyclical learning rate may vary greatly depending on a quantization error.

The quantized weight $w^{(q)}$ may be represented by adding quantization noise n to a full-precision weight $w^{(f)}$. The quantization noise n may increase as the quantization bit b decreases.

Since direct quantization of low-precision such as 1 bit or 2 bits may deteriorate the performance of the neural network, the processor 200 may perform training using a higher learning rate in the case of performing low-bit quantization to improve the neural network performance.

The cycle c of the cyclical learning rate may affect the learning performance. The processor 200 may use a cyclical learning rate having a predetermined c value. For example, the processor 200 may train a neural network using a cyclical learning rate having four to six epochs as one cycle.

The processor 200 may generate a discrete cyclical learning rate by dividing the interval between the maximum value $\eta_{cycleMax}$ and the minimum value $\eta_{cycleMin}$ of the cyclical learning rate into one or two steps.

The processor 200 may obtain second weights from a neural network model corresponding to the lowest learning rate (i.e., $\eta_{cycleMin}$) while second training the first trained neural network using the discrete cyclical learning rate.

The processor 200 may calculate an average value of the obtained second weights. Each of the second weights may be a weight obtained from the second trained neural network based on each of the learning rates.

The second training with a quantized weight may cause a low-precision neural network model. The processor 200 may calculate the average value of the second weights and perform third training, thereby moving the third trained neural network model to the center of the loss surface, thereby improving the generalization capability of the third trained neural network.

The number of second neural networks from which the second weights are obtained may affect the entire training process. The processor 200 may obtain an average value of second weights for a number of second trained neural network models. In an example, the processor 200 may obtain an average value of second weights corresponding to seven second trained neural network models.

If an average is calculated only for second weights of an overly small number of models, the performance of the finally trained neural network may deteriorate. If an average of an overly large number of neural network models is calculated, training may be inefficient. Thus, the processor 200 may calculate an average value for second neural networks the number of which may be efficient and guarantee the performance of the neural network.

To obtain a neural network model quantized with low precision, the processor 200 may quantize the average value of the second weights and third train the second trained neural network model based on the quantized average value.

In an example, the processor 200 may third train the second trained neural network model with an epoch less than or equal to a predetermined epoch based on a learning rate smaller than a greatest value of the learning rates.

The processor 200 may perform the third training with a relatively low learning rate, thereby performing fine-tuning for the second trained neural network model. The processor 200 may perform the third training using a monotonically decreasing learning rate. For example, the processor 200 may perform the third training for three to four epochs, while starting from a learning rate that is 0.1 times the maximum value of the cyclical learning rate and gradually decreasing the learning rate for each epoch.

Figure 4A:
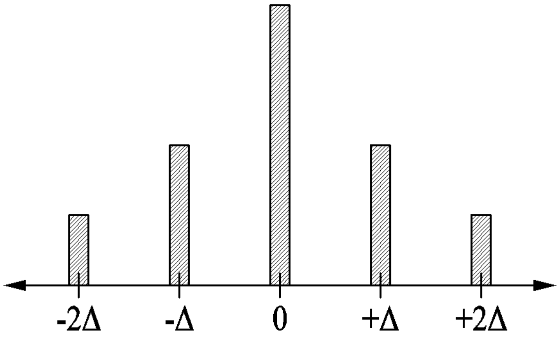
FIG. 4A illustrates an example of quantization.
Figure 4B:
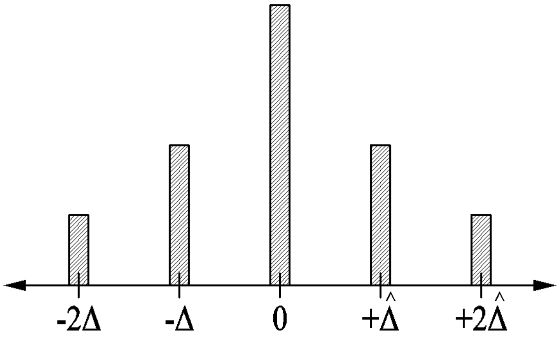
FIG. 4B illustrates an example of quantization.
Figure 4C:
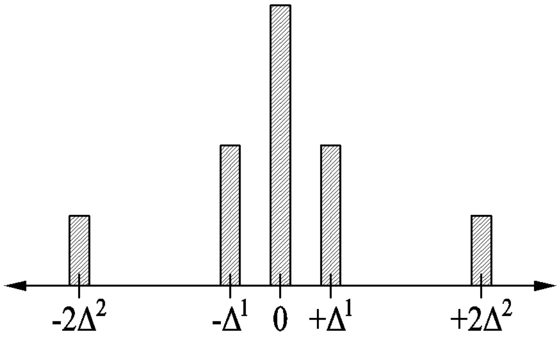
FIG. 4C illustrates an example of quantization.

FIGS. 4A to 4C illustrate examples of quantization.

Referring to FIGS. 4A to 4C, the processor 200 may quantize a first weight corresponding to a first trained neural network. The processor 200 may quantize an average value of second weights.

In an example, the processor 200 may quantize the weights of the first trained neural network with a target precision of predetermined bits. For example, the processor 200 may quantize the weights of the first trained neural network with a target precision of 1, 2, 3 or 4 bits.

In an example, the processor 200 may quantize the averaged neural network model based on the precision of a neural network model desired to be finally obtained. For example, the processor 200 may quantize the averaged model to 2 bits.

In an example, the processor 200 may perform various quantization schemes. For example, the processor 200 may quantize the weights using symmetric uniform quantization, asymmetric uniform quantization or nonuniform quantization.

FIG. 4A shows an example of symmetric uniform quantization, FIG. 4B shows an example of asymmetric uniform quantization, and FIG. 4C shows an example of nonuniform quantization.

The processor 200 may quantize the average value of the second weights, thereby improving the precision of the neural network. For example, when symmetric uniform quantization is used, the 2-bit precision is represented by a total of three steps $-\Delta$, 0, and $+\Delta$. In the case of calculating an average value of seven symmetric uniform quantized models, the average value may be a 4-bit neural network model having fifteen steps of $-7\Delta$, $-6\Delta$, $-5\Delta$, $-4\Delta$, $-3\Delta$, $-2\Delta$, $-1\Delta$, 0, $+1\Delta$, $+2\Delta$, $+3\Delta$, $+4\Delta$, $+5\Delta$, $+6\Delta$, and $+7\Delta$.

In this example, the neural network model corresponding to the average value is likely to be positioned at the center of the loss surface. The closer the quantized neural network model is to the center of the loss surface, the higher the performance of the neural network.

Figure 5A:
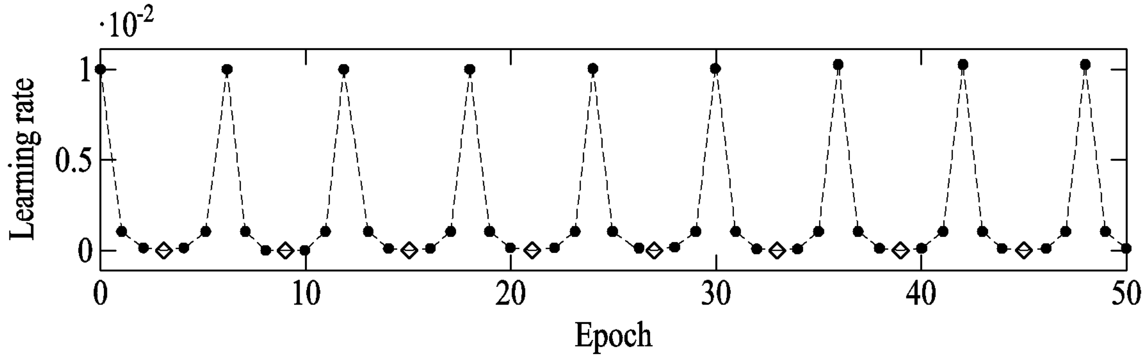
FIG. 5A illustrates an example of a learning rate.
Figure 5B:
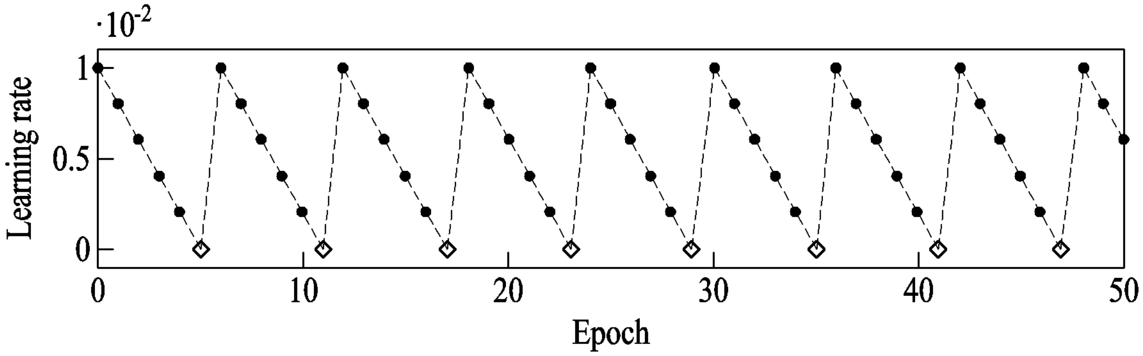
FIG. 5B illustrates an example of a learning rate.

FIGS. 5A and 5B illustrate examples of learning rates.

Referring to FIGS. 5A and 5B, the processor 200 may second train a first trained neural network model based on learning rates. The processor 200 may second train the first trained neural network model based on a cyclical learning rate.

The examples of FIGS. 5A and 5B may show cyclical learning rates. A cyclical learning rate may have a learning rate that repeats for each epoch of a predetermined cycle. The cyclical learning rate may change linearly or nonlinearly within one cycle.

The example of FIG. 5A shows a cyclical learning rate that changes nonlinearly, and the example of FIG. 5B shows a cyclical learning rate that changes linearly. The cyclical learning rate may have one or more cycles.

The processor 200 may repeatedly perform second training using the cyclical learning rate, and obtain second weights from the second trained neural network model based on a lowest learning rate from among the learning rates of each cycle.

The lowest learning rates in the examples of FIGS. 5A and 5B are indicated with rhombus points. That is, the processor 200 may obtain the second weights from the second trained neural network based on the learning rates corresponding to the rhombus points.

Figure 6:
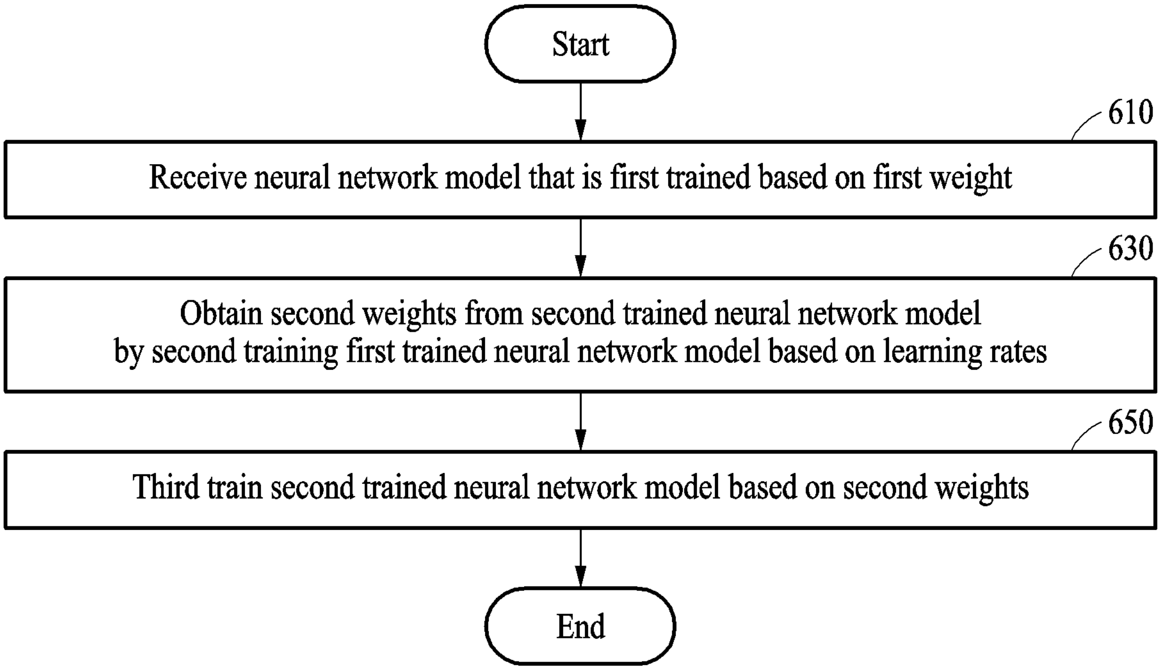
FIG. 6 illustrates an example of a flow of operation of the neural network training apparatus of FIG. 1.

FIG. 6 illustrates an example of a flow of operation of the neural network training apparatus of FIG. 1. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. Operations 610 to 630 of FIG. 6 may be performed by the neural network training apparatus 10 of FIG. 1. One or more blocks of FIG. 6, and combinations of the blocks, can be implemented by special purpose hardware-based computer, such as a processor, that perform the specified functions, or combinations of special purpose hardware and computer instructions. In addition to the description of FIG. 6 below, the descriptions of FIG. 1-5 are also applicable to FIG. 6, and are incorporated herein by reference. Thus, the above description may not be repeated here.

Referring to FIG. 6, in operation 610, the receiver 100 may receive a neural network model that is first trained based on a first weight. The first weight may include a quantized weight.

In operation 630, the processor 200 may obtain second weights from a second trained neural network model by second training the first trained neural network model based on learning rates.

The processor 200 may second train the first trained neural network model based on the learning rates. In an example, the processor 200 may second train the first trained neural network model based on a cyclical learning rate. In an example, the cyclical learning rate may change linearly or nonlinearly within one cycle.

The processor 200 may obtain the second weights from the second trained neural network model based on the learning rates. The processor 200 may obtain the second weights from the second trained neural network model based a lowest learning rate from among the learning rates.

In operation 650, the processor 200 may third train the second trained neural network model based on the second weights. In an example, the processor 200 may obtain an average value of the second weights. In an example, the processor 200 may obtain a moving average value of the second weights.

In an example, the processor 200 may obtain a quantized average value by quantizing the obtained average value. The processor 200 may third train the second trained neural network model based on the quantized average value.

In detail, the processor 200 may third train the second trained neural network model with an epoch less than or equal to a predetermined epoch based on a learning rate less than a maximum value of the learning rates.

The neural network training apparatus 10, receiver 100, and other apparatuses, units, modules, devices, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the neural network training method. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application it will be apparent that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neural network training method, comprising:

initializing a neural network model at random;

obtaining a full-precision neural network model by training the initialized neural network model with full precision, wherein the full-precision neural network model is trained using batch normalization, knowledge distillation, or stochastic weight averaging;

quantizing the weights of the full-precision neural network model to obtain a quantize neural network model;

performing a retraining algorithm to retrain the quantized neural network model based on a plurality of cyclical learning rates to obtain a plurality of second weights from the retrained quantized neural network model, wherein the plurality of second weights are obtained in response to a learning rate being lowest within a cycle of the plurality of cyclical learning rates;

storing the plurality of the of second weights of the retrained quantized neural network when the learning rate is the lowest within the cycle;

obtaining a quantized average value by quantizing an average value of the stored plurality of second weights; and fine-tuning the quantized neural network model based on the quantized average value, wherein the fine-tuning is performed with an epoch less than or equal to a predetermined number of epoch based on the learning rate less than a maximum of the plurality of cyclical learning rates, to obtain a neural network model quantized with low precision.

2. The neural network training method of claim 1, wherein the one or more cyclical learning rates change linearly or nonlinearly within one cycle.

3. The neural network training method of claim 1, wherein the obtaining of the average value comprises obtaining a moving average value of the second weights.

4. A non-transitory computer-readable storage medium storing instructions that, when executed by a processor, cause the processor to perform the neural network training method of claim 1.

5. A neural network training apparatus, comprising:

a processor configured to initialize a neural network model at random, quantize the weights of a full-precision neural network model to obtain a quantize neural network model, perform a retraining algorithm to retrain the quantized neural network model based on a plurality of cyclical learning rates to obtain a plurality of second weights from the retrained quantized neural network model, wherein the plurality of second weights are obtained in response to a learning rate being lowest within a cycle of the plurality of cyclical learning rates, store the plurality of second weights of the retrained quantized neural network when the learning rate is the lowest within the cycle, obtain a quantized average value by quantizing an average value of the stored plurality of second weights, and fine-tune the quantized neural network model based on the quantized average value, wherein the fine-tuning is performed with an epoch less than or equal to a predetermined number of epoch based on the learning rate less than a maximum of the plurality of cyclical learning rates, to obtain a neural network model quantized with low precision.

6. The neural network training apparatus of claim 5, wherein the one or more cyclical learning rates change linearly or nonlinearly within one cycle.

7. The neural network training apparatus of claim 5, wherein the processor is further configured to obtain a moving average value of the second weights.

8. A processor-implemented neural network training method, comprising:

initialized a neural network at random;

obtaining a full-precision neural network by training the initialized neural network with full precision, wherein the full-precision neural network is trained using batch normalization, knowledge distillation, or stochastic weight averaging;

quantizing weights of the full-precision neural network to obtain a quantize neural network;

performing a retraining algorithm to retrain the quantized neural network based on a plurality of cyclical learning rates to obtain a plurality of second weights from the retrained quantized neural network;

storing the plurality of second weights of the retrained quantized neural network, in response to the learning rate being lowest within a cycle;

obtaining a quantized average value by quantizing an average value of the stored plurality of second weights; and fine-tuning the quantized neural network based on the quantized average value, wherein the fine-tuning is performed with an epoch less than or equal to a predetermined number of epoch based on the learning rate less than a maximum of the plurality of cyclical learning rates, to obtain a neural network quantized with low precision.

9. The processor-implemented neural network training method of claim 8, wherein a high learning rate and a low learning rate are alternated in the cyclical learning rate.

10. The processor-implemented neural network training method of claim 8, wherein the cyclical learning rate changes according to a cycle of the epoch.

* * * * *